March 10, 1925.

A. A. HANSEN 1,529,483

AUTOMATIC SLIDING TAIL GATE

Filed Sept. 20, 1923  2 Sheets-Sheet 1

Inventor
Alfrey A. Hansen
By Lancaster Allwin
Attorney

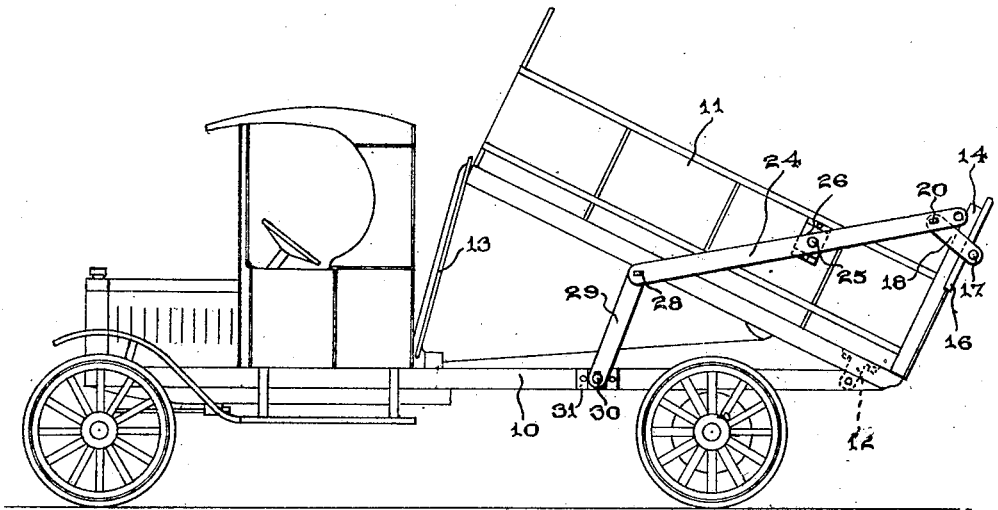

Patented Mar. 10, 1925.

1,529,483

UNITED STATES PATENT OFFICE.

ALFREY A. HANSEN, OF KANSAS CITY, KANSAS.

AUTOMATIC SLIDING TAIL GATE.

Application filed September 20, 1923. Serial No. 663,895.

*To all whom it may concern:*

Be it known that I, ALFREY A. HANSEN, a citizen of the United States, residing at Kansas City, in the county of Wyandotte and State of Kansas, have invented certain new and useful Improvements in Automatic Sliding Tail Gates, of which the following is a specification.

This invention relates to dumping trucks wherein tilting or hinged bodies are used, and more particularly to an automatic end gate for this type of truck.

An object of the present invention is to provide an upwardly movable end gate which is mounted upon the rear end of the wagon body and which is so connected between the body and the chassis and the vehicle as to slide the end gate into a more or less open position dependent on the adjustment which is made at the time of installation so as to secure either a spreading of material during forward movement of the truck with its body raised or a quick and complete dumping of the entire contents of the wagon box.

Another object of the invention is to provide a tail gate which will not spring under pressure of the load, which may be easily and positively closed and which will remain locked and cannot work open as it is held closed by the entire weight of the wagon box with its load, and a gate which will not spill sand, gravel or the like on the roadway until the box body is actually raised or tilted from its forward end.

A still further object of the invention is to provide an improved gate with its mounting and its operating mechanism which is simple in construction, durable in use and which may be economically manufactured and easily installed.

The above and various other objects and advantages of this invention will in part be described in and in part be understood from the following detailed description of the present preferred embodiment, the same being illustrated in the accompanying drawings, wherein:

Fig. 2 is a similar view showing the wagon box in tilted position and showing the tail gate open.

Fig. 4 is a rear elevation of the box body with the end gate applied thereto, the dotted lines showing the gate in raised position.

Fig. 7 is a detail perspective view of one of the pivot brackets for the truck box or body, and Fig. 8 is a fragmentary sectional view, enlarged, through the pivotal connection between a link and a lever taken substantially on the line 8—8 of Fig. 3.

Figure 1:
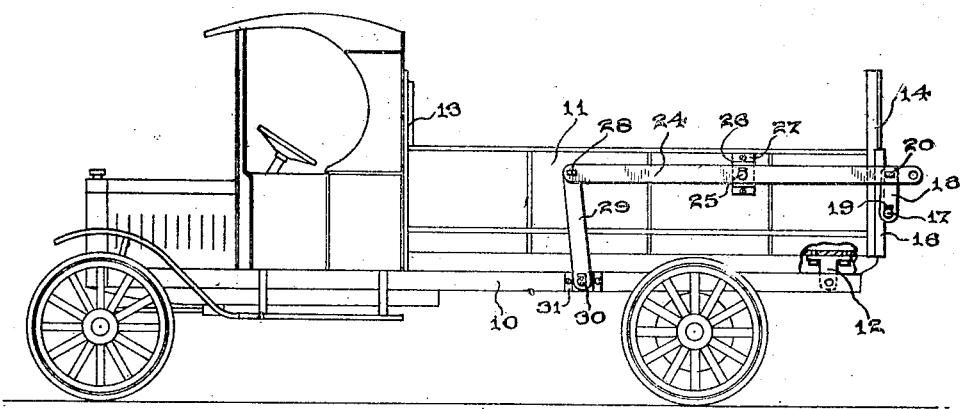
Fig. 1 is a side elevation of a motor vehicle truck having a tilting body and equipped with the automatic tail gate of this invention.
Figures 3, 5:
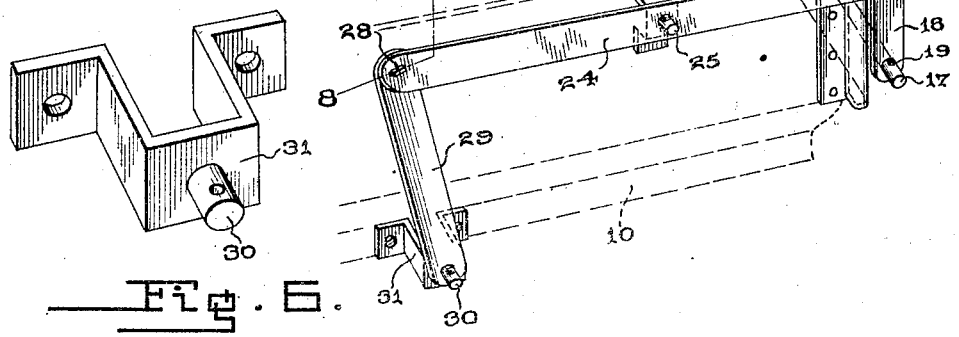
Fig. 3 is a fragmentary perspective view of one side of the mechanism and the adjacent end of the gate.
Fig. 5 is a detail perspective view of one of the forward pivot brackets for the chassis.
Figure 6:
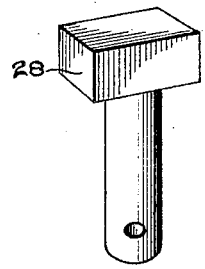
Fig. 6 is a detail perspective view of one of the pivot pins used for interconnecting the levers and links of the device.

Referring to the drawings 10 designates the chassis of a motor vehicle truck provided with a dumping body or box 11 pivotally connected at 12 to the rear end portion of the chassis 10 and adapted to be tilted or raised at its forward end by a hoisting device indicated diagrammatically at 13. The rear end of the wagon box 11 is open and to the sides of the box 11 at said rear end is secured a pair of guides 14 preferably of angle iron construction having one flange secured vertically against the outer side of the box 11 and having its other flange extending outwardly at right angles to the side of the box body 11. As there is a guide 14 at each side of the wagon box there is a pair of outturned flanges, and these flanges or guides extend above the wagon body a distance sufficient to support an end gate 15 in fully raised position and with over half of the height of the end gate in continual engagement with the guides 14. The end gate is thus prevented from binding upon the guides 14 should the pressure of the load tend to cant or bind the end gate 15 upon its guides.

The end gate 15 may be in the form of sheet metal with rolled over edges 16 forming shoes or channels adapted to slidably engage the guides 14 for maintaining the gate 15 from swinging outwardly from the box body under pressure of the load and also to prevent the bulging or distortion of the end gate 15. Secured, by welding or the like, across the rear side of the end gate 15 is a brace rod 17 the ends of which project beyond the ends of the gate 15 and receive thereon at said ends links 18 which are held upon the rod 17 by pins 19. The links 18 extend upwardly and are connected by a pivot pin 20 to the rear ends of a pair of levers 24 which are pivotally mounted on the sides of the wagon box. The levers 24 are arranged one upon each side of the wagon box and are apertured intermediate their ends for the reception of pivots studs 25 which project from brackets 26 mounted upon the opposite sides of the wagon body 11. The bracket 26 may be a casting or the like having outturned base flanges 27 adapted to receive screws or the like for securing the brackets near the upper edge of the wagon box at each side thereof.

The arms or levers 24 extend forwardly a suitable distance and are connected by a pivot pin 28 to the upper ends of links 29 which are pivotally mounted at their lower ends upon studs 30 which project from a bracket 31 secured by screws or the like to the opposite sides of the chassis 10.

In operation, when the box body is raised or tilted into the position shown in Fig. 2 the forward links 29 pull down the levers or arms 24 at their forward ends and thus swing the rear ends of the levers 24 upwardly and raise the tail gate 15 upon its guides 14 through the links 18. The operation is thus automatic and the links 18 may of course be pivoted to the levers 24 at any suitable point which will give the desired throw to the tail gate 15 in proportion to the distance through which the box body 11 is swung.

It is of course understood that various changes and modifications may be made in the details of construction and design of the above specifically described form of the invention without departing from the spirit thereof, all changes and modifications being restricted only by the scope of the following claims.

What is claimed is:

1. In combination with a vehicle chassis and a tilting box body thereon, a pair of guides mounted upon opposite sides of said box body at the rear end thereof, a tail gate slidably mounted on the guides for vertical movement into and out of a closing position, a pair of arms pivoted intermediate their lengths upon the opposite sides of the box body, a pair of links pivotally connected to the rear ends of the arms and to the tail gate, and a second pair of links pivotally connected to the forward ends of the arms and to said chassis.

2. In combination with a vehicle chassis and a tilting body thereon, a pair of outstanding flanges mounted upon the sides of the wagon box, a sheet metal tail gate extending across the rear end of the box body and having its ends rolled over to provide channels adapted to receive said flanges therein, a pair of arms pivoted intermediate their length to the opposite sides of the box body, means for connecting the rear ends of the arms to the end gate, and means for anchoring the forward ends of said arms to said chassis.

3. In combination with a vehicle chassis and a tilting body thereon, a pair of angle bars secured in upright position to the rear end of the tilting body, an end gate slidably mounted on said angle bars and adapted to normally close the wagon body, a pair of levers hinged intermediate their ends upon the opposite sides of the wagon body, a rod secured across the rear face of the end gate for reinforcing the same and having its ends projecting beyond the end gate, links pivoted on the ends of said rod and pivotally connected to the rear ends of said arms, and a pair of links pivotally mounted upon the chassis and having pivotal connection with the forward ends of said arms, whereby tilting of said body is adapted to raise the pivotal supports of said arms and the links on the chassis are adapted to swing said arms upwardly at their rear ends and raise the end gate.

4. In combination with a vehicle chassis and a dumping body thereon, a pair of vertical guides mounted upon the rear end of the dumping body, a tail gate slidably mounted upon said guides, a rod secured across the tail gate, a pair of rear links pivoted upon the rod, a pivot bracket at each side of the dumping body, an arm pivotally mounted intermediate its ends upon each pivot bracket and having its rear end pivotally connected to the adjacent rear link, a second pivot bracket mounted on each side of the chassis, and a front link pivoted upon each bracket on the chassis and having pivotal connection with the forward end of the adjacent arm.

5. In a device as specified, a pair of guides adapted to be mounted upon the rear end of a dumping wagon, an end gate slidably mounted on said guides for closing the rear end of a dumping wagon, a pair of arms having pivot brackets at their intermediate portions adapted to be secured to the opposite sides of the body of the dumping wagon, a pair of links carried by the tail gate and adapted for selective and adjustable connection with said arms, and a second pair of links having pivotal brackets on one end adapted for attachment to the opposite sides of the chassis of a dumping wagon and adapted to be pivotally connected to the forward ends of said levers.

ALFREY A. HANSEN.